June 23, 1970 E. W. THRASHER 3,516,461
SAW GUIDE APPARATUS
Filed March 27, 1968 2 Sheets-Sheet 2

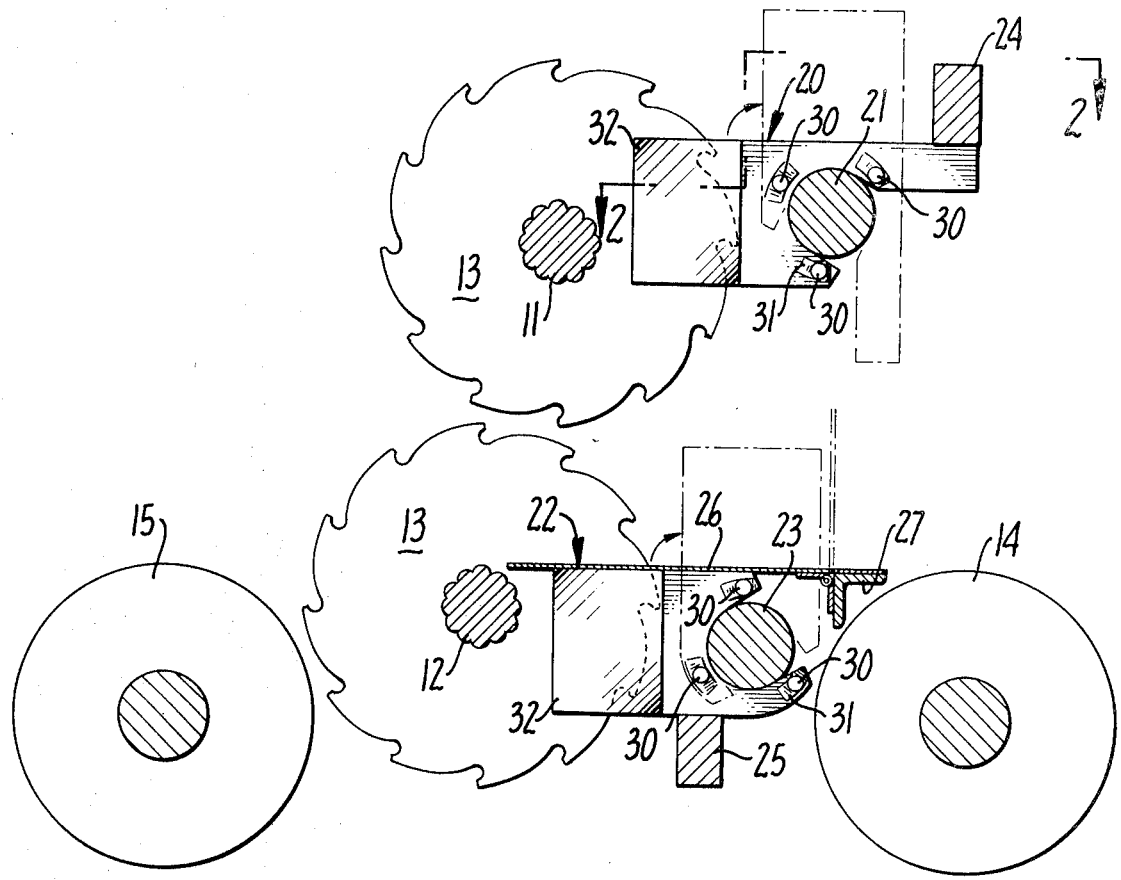
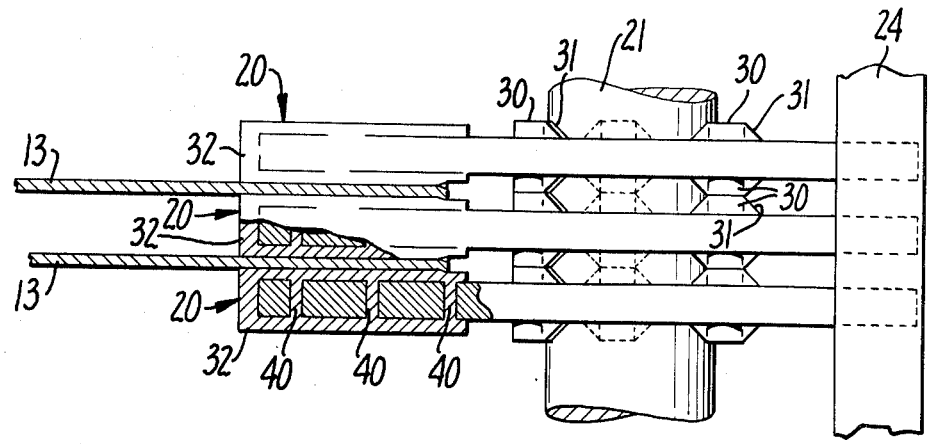

INVENTOR.
ELBRIDGE W. THRASHER
BY Eckhoff and Hoppe
ATTORNEYS

United States Patent Office 3,516,461
Patented June 23, 1970

3,516,461
SAW GUIDE APPARATUS
Elbridge W. Thrasher, Ukiah, Calif., assignor to Masonite Corporation, a corporation of Delaware
Filed Mar. 27, 1968, Ser. No. 716,527
Int. Cl. B27b *11/02*
U.S. Cl. 143—160                             14 Claims

ABSTRACT OF THE DISCLOSURE

An apparatus for guiding circular saws comprising a plurality of replaceable saw guides, each saw guide including a support arm having a bifurcated end pivotally engageable with a support member; a saw guide having a continuous sheathing of babbitt metal covering both sides or a portion thereof that may be positioned between saw blades, and including an integral gridwork of babbitt metal extending through the saw guide; and methods for forming saw guides of the kind described by initially providing a plurality of contacts on the saw guides, using those contacts to position the saw guide within a mold cavity, and forming a sheathing with prescribed clearances relative to saw blades which are to be guided therewith.

---

This invention relates to apparatus for guiding saws and maintaining a plurality of saws in parallel cutting planes. The invention has particular relation to my earlier invention of U.S. Pat. No. 3,285,302 in which saw guides including replaceable wear guides are used for controlling the cutting action of unusually thin saw blades. Apparatus of this type, it has been found, may be used to obtain a larger recovery of usable lumber than is otherwise possible with more conventional apparatus.

The present invention is concerned with the problem of providing a wear guide surface of great durability and yet which may be economically manufactured with great accuracy to maintain the dimensional stability required for controlling saw blades. The invention also provides a structural solution to the problem of mounting a plurality of saw guides upon a common support member to allow independent replacement and substitution without affecting the spacing between other saw guides.

It is to be understood that wear guides made of a moldable, anti-friction material, such as babbitt metal, have been contemplated and used in certain prior applications. However, prior to this invention, no means was found to economically form such wear guides with uniform and controlled thickness, or to use them in a manner that would permit independent replacement by wear guides of similar manufacture, and yet provide the necessary accuracy for guiding a battery of circular saw blades. The invention, therefore, does not involve the broad use of babbitt metals but, rather, it pertains to the method by which such material may be secured to a saw guide and to saw guide constructions having wear surfaces made with moldable, anti-friction materials.

In brief, this invention comprises an improvement in apparatus for guiding saws including replaceable saw guides having bifurcated ends pivotally engageable with a common support member. Each bifurcated end is formed with an opening on one side to receive the support member therethrough. This opening is so oriented that the saw guide may be disconnected from the support member when the saw guide is pivoted to a substantially upright position as to withdraw the saw guide from its saw guiding position between saw blades A second feature of the invention involves providing saw guides with wear surfaces formed with a continuous sheathing of a moldable, antifriction material, such as babbitt metal, and including an integral gridwork interconnecting the sheathing through the saw guide. Such a structure may be made economically by molding procedures, also forming a part of this invention, including the use of a plurality of contacts mounted on the saw guides to establish a precise spacing between wear guiding surfaces.

One object of this invention, therefore, is to provide an improved saw guide that may be used in connection with similar saw guides, each saw guide being easily and independently replaceable with respect to the others.

Another object is to provide saw guides of the kind described, each saw guide having a continuous sheathing of a moldable, anti-friction material that may be firmly secured to a support arm without the use of fasteners.

It is another object of the invention to provide novel methods for bonding a continuous sheathing of anti-friction material onto portions of a saw guide while simultaneously providing precise clearances between complementary guiding surfaces of a pair of saw guides.

Other objects of this invention will become apparent in view of the following detailed description and the accompanying drawings.

In the drawings forming a part of this application and in which like parts are identified by like reference numerals throughout the same, FIG. 1 is a vertical section taken through a double arbor battery edger having a plurality of saw guides and saw guiding apparatus constructed in a preferred manner contemplated by this invention;

FIG. 2 is an enlarged detail and section taken on lines 2—2 of FIG. 1;

Figure 3:
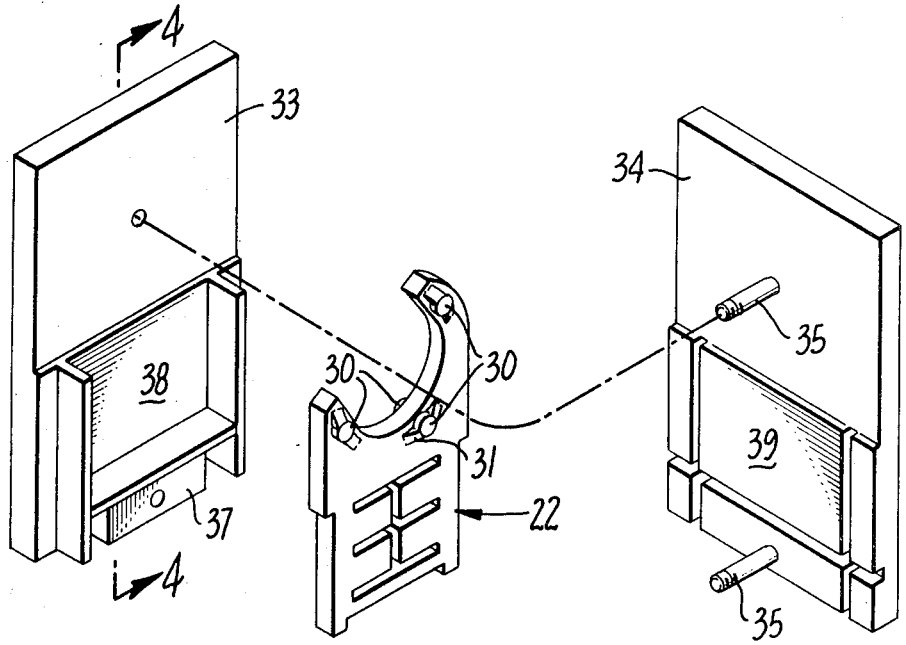
FIG. 3 is an exploded perspective view of a mold and saw guide, said mold being used to form a continuous sheathing of anti-friction material upon the saw guide.

Referring to FIG. 1 in particular, there is shown a double arbor battery edger comprised of upper and lower arbors 11 and 12, each arbor supporting a plurality of circular saws 13. Saws 13 are keyed to their respective arbors with floating axial looseness, as described in U.S. Pat. No. 3,285,302. A pair of rollers 14 and 15 form a part of conventional apparatus for moving cants or fliches into the battery of saws 13 and conveying the cut lumber through and past the blades.

This invention is more particularly directed to the construction of saw guiding apparatus for maintaining a plurality of saw blades in essentially parallel and spaced relationship upon arbors 11 and 12. This saw guiding apparatus comprises upper saw guides 20 pivotally mounted upon a circular cylindrical bar or support 21 and lower saw guides 22 similarly mounted upon a support 23. Both upper and lower saw guides are formed with bifurcated ends, each end having a semi-circular opening complementary to the outer surface of supports 21 and 23. The openings are so oriented that the bifurcated ends may be engaged with and mounted upon the respective support members while the saw guides occupy substantially vertical positions above their supporting member, as shown in FIG. 1 by broken-line views. It will be noted that in the vertical position each saw guide is withdrawn from between saws 13 and each may be lifted from its support member by a movement in a generally vertical direction. On the other hand, when the saw guides occupy a position interdigitated between saw blades 13, as shown in FIG. 2, they are essentially locked to the support members.

Each upper saw guide is maintained in a predetermined position between a pair of saw blades by a stop bar 24, although the guides may be independently pivoted to an upright position and removed from support 21 without affecting the position of other guides. Similarly, each lower saw guide 22 is also supported in a predetermined position by a stop bar 25 but may be pivoted to a vertical position for removal. A plate 26, having a plurality of fingers interdigitated between saw blades mounted to arbor 12, is pivotally hinged to an angle support 27. This plate serves to hold lower saw guides 22 against stop bar 25 while also providing a guiding support for feeding cants and fliches into the battery of saws. When any of the lower saw guides 22 is to be removed or replaced, plate 25 is pivoted into the upright position shown by its broken-line view.

A plurality of hardened contacts 30 mounted on each side of the saw guides are utilized for spacing the guides in predetermined positions along supporting arbors 21 and 23. The contacts of one saw guide complement and engage corresponding contacts formed on adjacent saw guides, as shown in FIG. 2. It will be further seen that inclined surfaces 31, which are provided on both sides of each contact, extend outward from the face of the saw guide to the associated contact in a generally circumferential direction relative to the pivot axis of support. The inclined surfaces of one saw guide cooperate with inclined surfaces of an adjacent guide to cam the saw guides axially apart, thereby facilitating the spacing and interdigitation of saw guides with saw blades. In addition, inclined surfaces of abutting contacts produce a shearing action as one saw guide is pivoted relative to the other. This shearing action removes any sawdust that may adhere to the surfaces of the contacts.

The spacing and function of contacts 30 as described in the preceding paragraph is a separate subject of the invention. Nevertheless, it has been found that such contacts have separate utility in a novel process for bonding a durable wear surface of moldable material to the saw guide. With particular reference to FIG. 2, a continuous sheathing 32 of babbitt metal is applied to the saw guiding portion of each saw guide 20 and 22 with a split mold comprised of a pair of symmetrical parts 33 and 34. These parts are adapted to be clamped upon the saw guide using the contacts 30, which are previously affixed thereto as by welding, to establish positive positioning of the saw guide within a mold cavity. In this way, sheathing 32 will be formed with wear surfaces that are always parallel with the planes defined by contacts 30 of the saw guides; and this will be true even though the saw guides themselves may be slightly warped, bent or of a variable thickness in those areas to which the material is bonded.

Figures 4, 5:
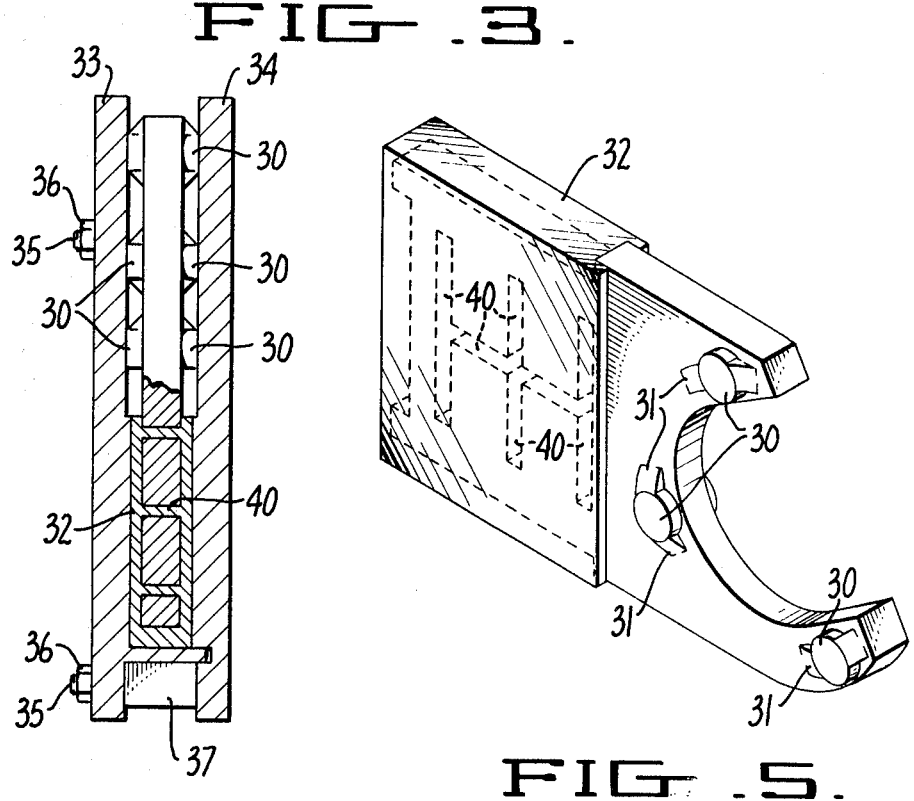
FIG. 4 is a section taken through the mold as assembled with the saw guide clamped therein.
FIG. 5 is a perspective view of a lower saw guide utilized in connection with the apparatus shown in FIG. 1.

Parts 33 and 34 of the mold are held together, clamped upon contacts 30 of the saw guide as shown in FIG. 4, by a pair of studs 35 and threaded nuts 36. Positive spacing at the lower end of the mold is provided by a spacer block 37 formed of a thickness precisely the same as the normal distance between contacts on opposite sides of a saw guide.

The mold cavity of parts 33 and 34 when assembled is defined by machined surfaces 38 and 39. These surfaces are formed in planes parallel to but offset relative to the spacing surfaces of the mold which engage the contacts 30 and the spacer block 37. The offset distance is equal to one-half the sum of the thickness of the saw blade to be guided and the designed width of total running clearance between complemental guiding surfaces of a pair of saw guides. Thus, each contact 30 projects beyond the guiding wear surface of sheathing 32 a distance equal to $\frac{1}{2}(W_B + W_C)$, where $W_B$ equals the width of the saw blade to be used, plus the amount of shrinkage which may be expected as a result of the molding material used; and $W_C$ equals the width of the running clearance allowed between the guiding surfaces of the saw blade.

An important facet of securing the molded sheathing 32 to the saw guide involves providing an integral gridwork 40 of molded material through the saw guide interconnecting both sides of the sheathing. In addition, the sheathing is preferably interconnected at the top, bottom and partially at both ends. Such a sheathing, it has been found, will have dimensional uniformity and yet cannot be easily sheared or loosened from the saw guide.

Various types and grades of babbitt metal may be used to form sheathing 32. However, one type that has been found particularly satisfactory is sold under the brand name of Kirkson, and is designated as a No. 4 hardware babbitt. Best results have been obtained by heating the babbitt to 1200° F. before pouring into the mold. In addition, the molds are heated to 300–800° F. before making an initial pour; and the saw guides are also preferably heated to a temperature in excess of 300° F. Although these temperatures may be varied within wide ranges, a repeated use of the same temperature conditions is desirable. A consistent use of the same temperatures, it has been found, will produce saw guides having sheathings of uniform thickness.

Thus, there is contemplated here a method for bonding a continuous sheathing of anti-friction material onto portions of a saw guide having a plurality of spacing contacts on both sides. This method more particularly involves initial forming of a gridwork of openings through the saw guide in that portion to which the sheathing is to be bonded. The saw guide is then clamped in a mold having a cavity defined by a pair of parallel spaced side walls, the distance between side walls being less than the total distance between contacts on opposite sides of the saw guide by the amount $(W_B + W_C)$, where $W_B$ equals the width of the saw blade to be guided, plus the amount of shrinkage which may be expected as a result of the molding material used; and where $W_C$ equals the width of the total running clearance allowed between the complemental guiding surfaces of two saw guides. The mold cavity is then filled with a liquid substance that will solidify and provide an anti-friction bearing. It is particularly contemplated that the liquid substance may consist of a molten babbitt metal and that the saw guide, mold and babbitt metal be heated to predetermined temperatures prior to pouring.

A second method of molding saw guides with babbitt metal involves the further use of wear strips made of Micarta, Teflon or other durable material. The irregularities often found in such wear strips may be rendered inconsequential by placing the wear strips in the mold with the saw guides and then using babbitt metal or similar material as a filler and anchoring media. The wear strips are positioned in close abutting contact with the lateral surfaces of the mold prior to filling the mold cavity; and the babbitt metal thereafter poured into the mold becomes an intermediate layer that is secured to both the saw guide and wear strips by integral anchors. For this purpose, openings are initially provided in the wear strips to receive the molten babbitt metal as it is poured into the mold. Such openings are preferably formed with an outward taper which locks the wear strips to the saw guide when the babbitt metal hardens.

This alternate method of molding wear surfaces upon saw guides, as described in the foregoing paragraph, possesses essentially the same advantages as forming wear surfaces entirely of babbitt metal. Here also, contacts 30 establish a positive positioning for forming wear surfaces in parallel planes and with precise spacing.

Although preferred forms of this invention have been illustrated and described, various modifications and changes may be made without departing from the spirit of the invention, and each of such modifications and changes is contemplated.

What is claimed is:

1. In apparatus for guiding circular saws and maintaining a plurality of saws in parallel cutting planes, an improved saw guide and support comprising: a support member extending substantially parallel to the saw arbor of a machine having a plurality of circular saws mounted thereon; and a plurality of replaceable saw guides, each saw guide including a support arm having a bifurcated end pivotally engageable with said support member, said bifurcated end being open on one side to receive said support member, a portion of each arm being positionable either in a position between a pair of adjacent saw blades or in a position withdrawn from between said blades, the open side of said bifurcated end being oriented to allow said support arm to be disengaged from said support member when the said portion of said support arm occupies a position withdrawn from between saw blades.

2. The apparatus of claim 1 and further comprising a stop bar for positioning the said portion of each support arm in a predetermined position between a pair of adjacent saw blades.

3. The apparatus of claim 1, the open side of each bifurcated end being oriented to allow a substantially vertical removal of the saw guide relative to the support member when the said portion of each support arm is in a position withdrawn from between said saw blades.

4. The apparatus of claim 1, said support member being a circular cylindrical bar supported near its ends, the bifurcated end of each support arm defining a semi-circular opening complementary to the outer surface of the bar.

5. The apparatus of claim 1, each saw guide further comprising a continuous sheathing of babbitt metal covering both sides of that portion of said support arm which may be positioned between saw blades.

6. The apparatus of claim 5, the sheathing of babbitt metal being interconnected through the support arm by a gridwork of integrally cast babbitt metal.

7. The apparatus of claim 5, the sheathing of babbitt metal being interconnected across the top and bottom surfaces of said support arm by integrally cast babbitt metal.

8. An apparatus for guiding saws and maintaining saws in parallel cutting planes, comprising: a support member; a pair of replaceable saw guides pivotally mounted upon said support member, each saw guide having guiding surfaces that may be positioned in guiding relationship to the opposite side of a saw blade, respectively, and a bifurcated end pivotally engageable with said support member, said bifurcated end being open on one side to receive said support member; and stop means for positioning said saw guides in predetermined positions for guiding a saw blade between said guiding surfaces.

9. The apparatus of claim 8, the open side of each bifurcated end being oriented to allow a substantially vertical movement and removal of the saw guide relative to said support member when said saw guide is pivoted into a substantially upright position as to place the guiding surface generally above said support member.

10. The apparatus of claim 8, said support member being comprised of a circular cylindrical bar supported near its ends, the bifurcated end of each saw guide defining a semi-circular opening complementary to the outer surface of the bar.

11. The apparatus of claim 8, each of said saw guides further including a plurality of contacts mounted to said bifurcated end, the contacts of one saw guide being complementary and engageable with those of the other saw guide to establish a precise spacing between said guiding surfaces.

12. An apparatus for guiding saws and maintaining saws in parallel cutting planes, comprising: a support, a replaceable saw guide including means for detachably mounting said guide upon said support, said guide having a continuous layer of babbitt metal including anchoring connections imbedded and extending transversely through openings formed in said guide.

13. The apparatus of claim 12, said layer of babbitt metal being a sheathing which defines saw guiding surfaces on both sides thereof, said sheathing including integrally formed connections through the saw guide and top, bottom and end connections.

14. The apparatus of claim 13, said saw guide further including a plurality of contacts mounted on one side thereof, said contacts being complementary to and engageable with contacts mounted on an adjacent saw guide for establishing a precise spacing between the guiding surfaces of each, each contact on one side of said guide extending in a direction normal thereto and projecting beyond the guiding surfaces of said sheathing a distance equal to $\frac{1}{2}(W_B + W_C)$, where $W_B$ equals the width of saw blade to be used, plus the amount of shrinkage which may be expected as a result of the molding material used; and where $W_C$ equals the width of running clearance allowed between the guiding surfaces of the saw guides.

References Cited
UNITED STATES PATENTS

| | | | |
|---|---|---|---|
| 694,338 | 1902 | Van Horn | 143—160 X |
| 3,119,420 | 1964 | Nelson | 143—160 |
| 3,285,302 | 1966 | Thrasher | 143—37 |

ANDREW R. JUHASZ, Primary Examiner

J. F. COAN, Assistant Examiner

U.S. Cl. X.R.

143—33, 37; 287—52.02